(12) United States Patent
Dutart

(10) Patent No.: US 6,467,269 B1
(45) Date of Patent: Oct. 22, 2002

(54) ALTITUDE COMPENSATION FOR TURBOCHARGER WASTEGATE

(75) Inventor: Charles H. Dutart, Washington, IL (US)

(73) Assignee: Caterpillar Inc, Peoria, IL (US)

(*) Notice: Subject to any disclaimer, the term of this patent is extended or adjusted under 35 U.S.C. 154(b) by 0 days.

(21) Appl. No.: 10/028,903

(22) Filed: Dec. 20, 2001

(51) Int. Cl.[7] ............................................... F02B 37/12
(52) U.S. Cl. ........................ 60/602; 60/605.2; 123/564
(58) Field of Search ........................... 60/600, 601, 602, 60/605.2; 123/564

(56) References Cited

U.S. PATENT DOCUMENTS

| | | | | |
|---|---|---|---|---|
| 3,751,116 A | * | 8/1973 | Engle | 303/20 |
| 3,834,383 A | * | 9/1974 | Weigl et al. | 128/245.8 |
| 3,892,254 A | * | 7/1975 | Hilgert | 137/116.3 |
| 5,960,631 A | * | 10/1999 | Hayashi | 60/602 |
| 6,012,289 A | | 1/2000 | Deckard et al. | 60/602 |
| 6,018,948 A | * | 2/2000 | Schnaibel et al. | 60/602 |

* cited by examiner

Primary Examiner—Hoang Nguyen
(74) Attorney, Agent, or Firm—Todd T Taylor

(57) ABSTRACT

A wastegate valve for a turbocharger system in an engine of a work machine, vehicle or the like particularly suitable for operation at changing altitudes. The wastegate valve includes a spring operating against an adjustable spring seat. The adjustable spring seat is adjusted in response to ambient pressure changes to alter the installed length of the spring.

20 Claims, 2 Drawing Sheets

ALTITUDE COMPENSATION FOR TURBOCHARGER WASTEGATE

TECHNICAL FIELD

The present invention relates generally to turbocharged internal combustion engines, and, more specifically, to turbocharger systems having a wastegate control valve for controlling exhaust flow to a turbocharger.

BACKGROUND

A limiting factor in the performance of an internal combustion engine is the amount of combustion air that can be delivered to the intake manifold for combustion in the engine cylinders. Atmospheric pressure is often inadequate to supply the required amount of air for efficient operation of an engine.

It is known to use turbochargers in the intake air supply of internal combustion engines to increase the combustion air supplied to the combustion cylinders. Each turbocharger typically includes a turbine having a turbine wheel driven by exhaust gases from the engine, and one or more compressors having compressor wheels driven by the turbine through a common turbocharger shaft carrying both the turbine wheel and the compressor wheel. The compressor receives the fluid to be compressed, and supplies the compressed fluid to the combustion chambers. The fluid compressed by the compressor may be in the form of combustion air only, or may be a mixture of fuel and combustion air. Through the use of a turbocharger, the power available from an engine of given size can be increased significantly. Thus, a smaller, less expensive engine may be used for a given power requirement, and power loss due to, for example, changes in altitude, can be compensated for.

Under some conditions, a turbocharger can provide combustion air at too great of pressure for the intake manifold or combustion cylinders, leading to possible engine damage. Overspeed operation of a turbocharger can lead to damage to the turbocharger as well. It is known to use a wastegate control valve in the exhaust flow stream to the turbocharger. A branch line of the exhaust system bypasses the turbine wheel of the turbocharger. Operation of the wastegate valve can direct exhaust flow through the bypass line, thereby reducing the exhaust gas flow to the turbine wheel, reducing turbine wheel speed and thereby the boost or pressure of air supplied by the turbocharger compressor.

It is known to use both mechanical and electrical control systems for wastegate valve operation. U.S. Pat. No. 6,012, 289 entitled "Apparatus and Method for Utilizing a Learned Wastegate Control Signal for Controlling Turbocharger Operation", assigned to the assignee of the present invention, discloses a method for controlling an engine turbocharger having a wastegate control valve. The turbocharger is controlled by an electronic controller, which is capable of delivering a wastegate control signal to the wastegate control valve.

Turbocharged internal combustion engines having wastegate control valves can experience additional difficulties in operation at high altitude, due to the reduced atmospheric pressure. The reduced atmospheric pressure can result in unfavorable pressure differences across the wastegate diaphragm. The wastegate may not be able to open under the given control system, or may open less than required, causing higher than acceptable turbine inlet pressures. Machines operated at both high and low altitude locations are not easily outfitted with control strategies that will take into consideration the effects of changing altitudes on the wastegate control valve operation.

The present invention is directed to overcoming one or more of the problems as set forth above.

SUMMARY OF THE INVENTION

In one form thereof, the present invention provides an internal combustion engine with a combustion cylinder; an exhaust system in flow communication with the combustion cylinder, to receive exhaust gases from the combustion cylinder; a combustion air system connected in flow communication to the combustion cylinder, to supply air to the combustion cylinder for supporting combustion; and a turbocharger. The turbocharger includes a compressor having an inlet and an outlet, a turbine having an inlet connected to receive a flow of exhaust gases from the combustion cylinder, and a wastegate valve for controlling the flow of exhaust gases to the turbine. The wastegate valve includes a valve housing, and a valve diaphragm in the valve housing separating the valve housing into first and second valve compartments having a first valve compartment pressure and a second valve compartment pressure. One of the first and second valve compartment pressures is ambient pressure. A valve rod is connected to the valve diaphragm. A spring is operatively connected to exert a spring force against the valve rod, the spring having an installed spring length. An adjustable spring seat is adjustable in height, for varying the installed spring length of the spring in response to changes in the ambient pressure.

In another form thereof, the present invention provides a wastegate with a valve housing, a valve diaphragm in the valve housing separating the valve housing into first and second valve compartments having a first valve compartment pressure and a second valve compartment pressure. One of the first valve compartment pressure and the second valve compartment pressure is ambient pressure. A valve rod is connected to the valve diaphragm. A spring is operatively connected to exert a spring force against the valve rod, the spring having an installed spring length. An adjustable spring seat is adjustable in height, for varying the installed spring length of the spring in response to changes in the ambient pressure.

In yet another form thereof, the present invention provides a method for controlling operation of a wastegate valve, the method comprising steps of: providing a wastegate valve having a valve housing, a valve diaphragm separating the valve housing into first and second valve compartments, a valve rod connected to the valve diaphragm and extending through one of the compartments, and a spring operatively connected to exert a spring force against the valve rod, for urging the rod in a direction, the spring having an installed spring length; providing an adjustable spring seat for altering the spring force applied against the rod; detecting ambient pressure changes; and adjusting the spring seat in response to changes in ambient pressure.

BRIEF DESCRIPTION OF THE INVENTION

DETAILED DESCRIPTION

Figure 1:
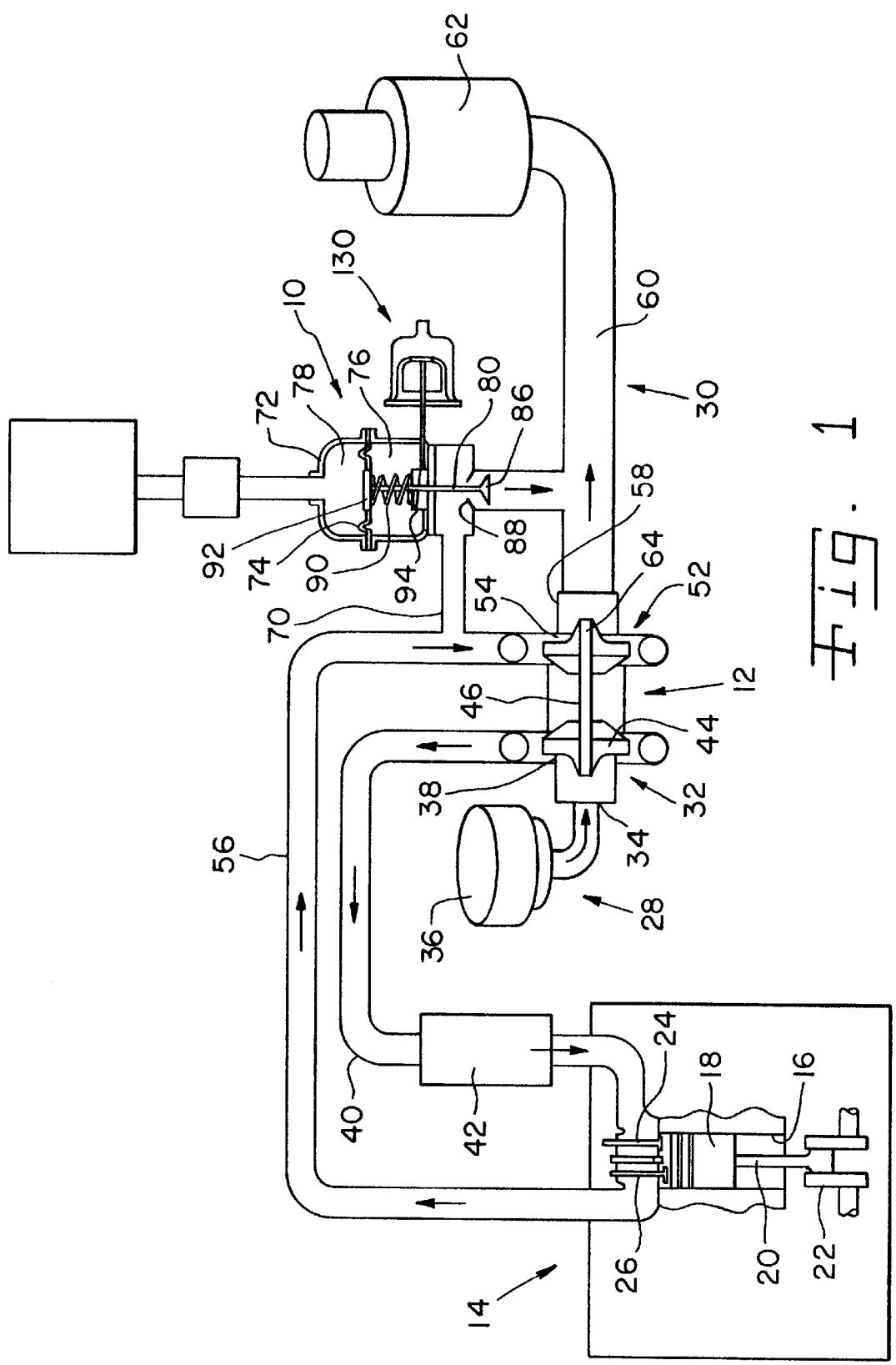
FIG. 1 is a partial cross-sectional view of an internal combustion engine having an altitude compensated wastegate for a turbocharger according to the present invention.

Referring now more specifically to the drawings, and to FIG. 1 in particular, there is shown a wastegate control valve 10 in accordance with the present invention. Wastegate control valve 10 operates in a turbocharger system 12 of an internal combustion engine 14.

Engine 14 is of known design, and includes a plurality of combustion cylinders 16, one combustion cylinder 16 being shown in FIG. 1. A piston 18 is operatively disposed in each combustion cylinder 16, and is connected by a piston rod 20 to a crankshaft 22. At least one intake valve 24 and at least one exhaust valve 26 are provided in each combustion cylinder 16. Intake valve 24 controls flow communication between a combustion air system 28 and combustion cylinder 16, and exhaust valve 26 controls flow communication between an exhaust system 30 and combustion cylinder 16. As those skilled in the art will understand readily, engine 10 can be one of spark ignition operating design, compression ignition, or other common or less common design. The particular design for engine 10 shown and described herein is merely one suitable configuration.

Turbocharger system 12 includes a compressor 32 having a compressor inlet 34 in flow communication with a source of combustion air, such as ambient air, received through an air cleaner 36. A compressor outlet 38 is connected in flow communication to an inlet air duct 40 of combustion air system 28, which may further include an aftercooler 42. A compressor wheel 44 is operatively disposed, in known manner, between compressor inlet 34 and compressor outlet 38. Compressor wheel 44 is carried on a turbocharger shaft 46.

Turbocharger system 12 further includes a turbine 52 having a turbine inlet 54 in flow communication with exhaust system 30 via an exhaust duct 56. A turbine outlet 58 is connected inflow communication to an exhaust line 60 of exhaust system 30, which may further include an exhaust muffler 62. A turbine wheel 64 is operatively disposed, in known manner, between turbine inlet 54 and turbine outlet 58. Turbine wheel 64 is carried on turbocharger shaft 46, at an opposite end thereof from compressor wheel 44.

Wastegate control valve 10 is provided in a bypass line 70 connected in flow communication between exhaust duct 56 and exhaust line 60. Bypass line 70 provides a parallel path to that through turbine 52, and wastegate control valve 10 controls the flow of an exhaust gas stream reaching turbine wheel 64 by controllably opening and closing the path through bypass line 70.

Figure 2:
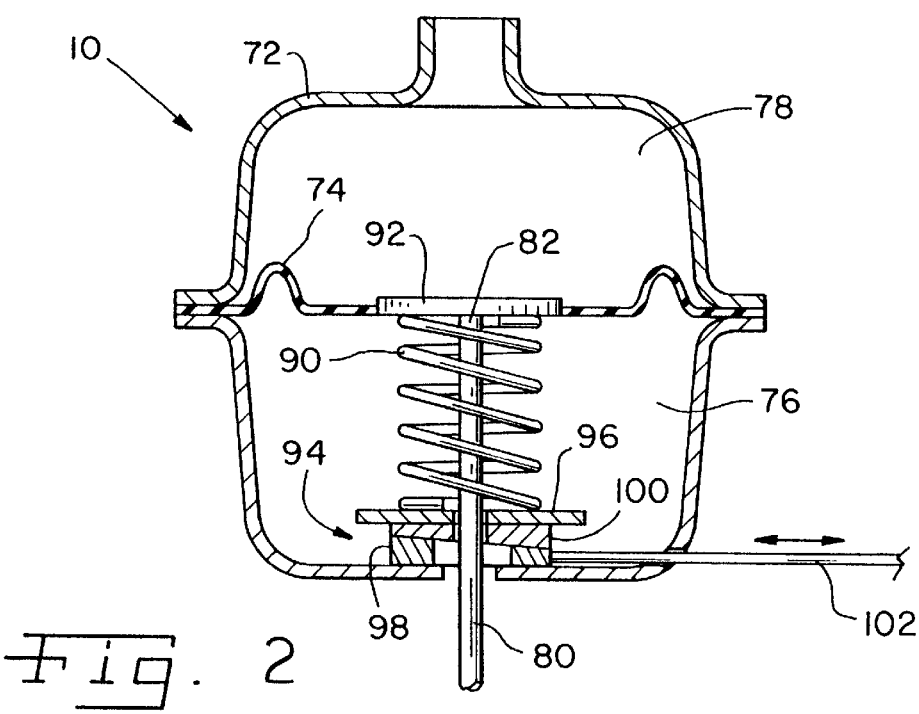
FIG. 2 is an enlarged cross-sectional view of the adjustable wastegate shown in FIG. 1.

As can be more clearly seen in FIG. 2, wastegate control valve 10 includes a valve housing 72 and a valve diaphragm 74 disposed in valve housing 72. Valve diaphragm 74 separates the interior of valve housing 72 into separate first and second valve compartments 76 and 78, respectively. First and second valve compartments 76 and 78 are isolated from each other, to separately contain first and second valve compartment pressures. Valve diaphragm 74 is a rubberized or other flexible body, the position of which can vary as the relative pressure differential changes between first and second valve compartment pressures in first and second valve compartments 76 and 78.

A valve rod 80 has a first end 82 connected to valve diaphragm 74, and a second end 84 (FIG. 1) having a valve head 86 operating in a valve opening 88 of bypass line 70. Valve rod 80 moves in response to movement of valve diaphragm 74, to open and close opening 88. A spring 90 is operatively connected to exert a spring force against valve rod 80, biasing valve rod 80 in a direction. In the embodiment illustrated in FIG. 2, spring 90 is disposed in first valve compartment 76, and first valve compartment 76 is connected openly to the ambient environment so as to remain at ambient pressure. Spring 90 operates between an fixed spring seat 92 on valve diaphragm 74, and an adjustable spring seat 94 in first valve compartment 76. Adjustable spring seat 94 is controllable to reposition a plate 96, to alter the installed height of spring 90, in response to changes in the ambient pressure.

In a first embodiment of adjustable spring seat 94, a cam means includes first and second angular blocks 98 and 100, respectively. Angular blocks 98 and 100 are reverse positioned, wedge-shaped ramps disposed one on top of the other. Relative movement between blocks 98 and 100 brings thicker or thinner portions of each in superimposed engagement, thereby making the overall thickness of adjustable spring seat 94 thicker or thinner, as desired. To accomplish the relative movement therebetween, at least one of the blocks 98 and 100 is linearly translatable relative to the other block 98 or 100. In the embodiment shown, linear translation of block 98 is achieved through movement by a control rod 102. Block 100 is secured to plate 96.

Figure 4:
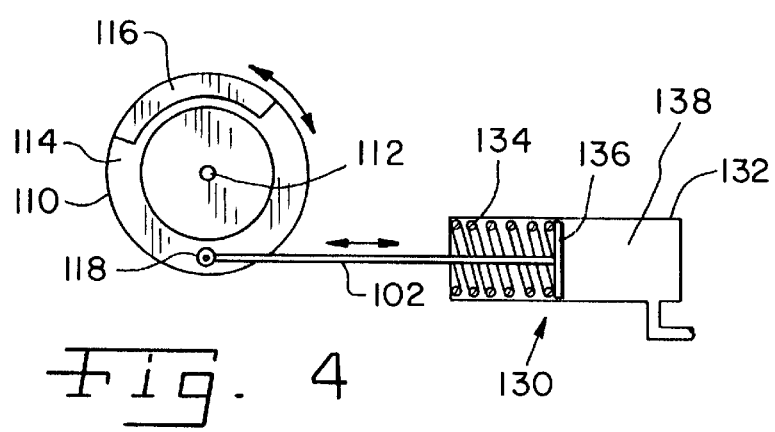
FIG. 4 is a plan view of an alternative embodiment of an adjustable spring seat for the wastegate.

An alternative embodiment of adjustable spring seat 94 is shown in FIG. 4, wherein a cam means includes a disk 110 rotatably secured around a pivot connection 112. A peripheral portion 114 of disk 110 has a ramp 116. Control rod 102 is tangentially connected to disk 110 by a pin 118, such that substantially axial movement of control rod 102 cause rotation of disk 110 about pivot connection 112.

Axial movement of control rod 102 is achieved through an actuator 130 that may be passive or active in design. Active actuators 130 can be electric, hydraulic or pneumatic prime movers controlled by the engine ECM (not shown) in response to the receipt of operating and performance data of engine 14 and/or turbocharger 12. As illustrated in FIG. 4, a pneumatic actuator 132 includes a return spring 134 operating against a piston 136 in a pressurizable chamber 138.

Figure 3:
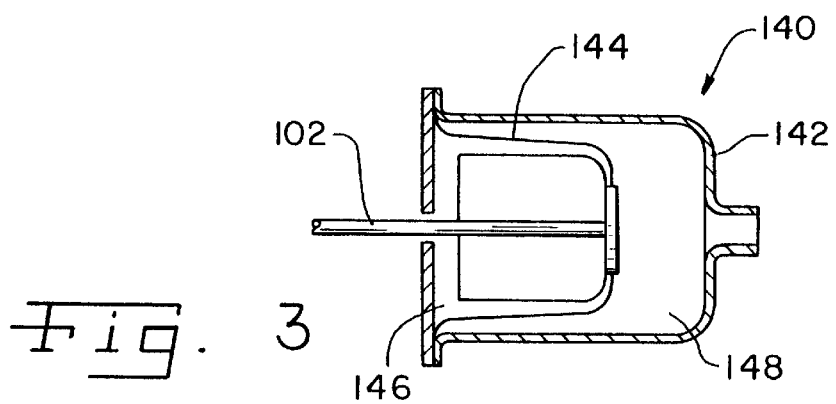
FIG. 3 is an enlarged cross-sectional view of an actuator for the adjustable wastegate.

A suitable passive actuator 130 is shown in FIG. 3, in the form of an actuator pot 140 that moves control rod 102 automatically in response to ambient pressure changes. Actuator pot 140 includes an actuator housing 142 and an actuator diaphragm 144 disposed in actuator housing 142. Actuator diaphragm 144 separates the interior of actuator housing 142 into separate first and second actuator compartments 146 and 148, respectively. First and second actuator compartments 146 and 148 are isolated from each other, to separately contain first and second actuator compartment pressures. Actuator diaphragm 144 is a rubberized or other flexible body, the position of which can vary as the relative pressure differential changes between first and second actuator compartment pressures in first and second actuator compartments 146 and 148.

Control rod 102 extends through first actuator compartment 146, which is open to the ambient environment, and thereby maintained at ambient pressure. Second actuator compartment 148 is maintained at a controlled pressure, so that changes in ambient pressure in first actuator compartment 146 cause a movement of actuator diaphragm 144, and corresponding movement of control rod 102.

The controlled pressure in second actuator compartment 148 can be achieved in several ways. For example, second actuator compartment 148 can be a sealed compartment, provided with a desired controlled pressure at the time of manufacture and assembly. As another example, second actuator compartment 148 can be connected to a regulated pressure source, with an appropriate pressure regulator valve (not shown) controlling the pressure supplied to second actuator compartment 148. Adjustment also can be achieved in a variety of structural variations, such as a pivotable frame structure (not shown) holding diaphragm 144, to vary the position of diaphragm 144. A return spring 134 also may be incorporated with the various modifications discussed herein.

INDUSTRIAL APPLICABILITY

During operation of engine 14, fuel and air are combusted in known manner in combustion cylinder 16. Exhaust gases from the combustion process flow from cylinder 16, through exhaust duct 56 to turbine 52 of turbocharger system 12. Exhaust gas flow along turbine wheel 64 from turbine inlet 54 to turbine outlet 58 causes rotation of turbine wheel 64 and turbine shaft 46 connected thereto. Turbine shaft 46 rotates compressor wheel 44. Air drawn in to compressor inlet 34 from air cleaner 36 is compressed and supplied to inlet air duct 40 and combustion cylinder 16.

Under some operating conditions, it is desirable to reduce the flow of exhaust gas to turbine 52, slowing rotation turbocharger shaft 46 and lowering the boost obtained from compressor 32. This can be achieved by operating wastegate 10 to open valve opening 88, allowing exhaust gas flow through bypass line 70, directly from exhaust duct 56 to exhaust line 60.

As the ambient pressure changes, due, for example, to changes in altitude, the pressure in first actuator compartment 146 of actuator pot 140 also changes. Since the pressure in second actuator compartment 148 is fixed, any change in pressure in first actuator compartment 146 causes movement of actuator diaphragm 144, and corresponding axial movement of control rod 102. As control rod 102 moves axially, adjustable spring seat 102 is caused to become thicker or thinner, through linear movement of block 98 in the embodiment illustrated in FIG. 2, or through rotation of disk 110 in the embodiment illustrated in FIG. 4.

The present invention for a wastegate valve compensates for changes in operation of the valve resulting from ambient pressure changes. The installed spring length of the wastegate spring is adjusted through adjustment of an adjustable spring seat provided in the wastegate valve. An actuator is provided for adjusting the adjustable spring seat automatically, as the ambient pressure changes.

Other aspects, objects and advantages of this invention can be obtained from a study of the drawings, the disclosure and the appended claims.

What is claimed is:

1. An internal combustion engine comprising:
    a combustion cylinder;
    an exhaust system in flow communication with said combustion cylinder, to receive exhaust gases from said combustion cylinder;
    a combustion air system connected in flow communication to said combustion cylinder, to supply air to said combustion cylinder for supporting combustion; and
    a turbocharger including a compressor having an inlet and having an outlet connected in flow communication to said combustion air system, a turbine having an inlet connected to receive a flow of exhaust gases from said combustion cylinder, and a wastegate valve for controlling the flow of exhaust gases to said turbine; said wastegate valve including:
        a valve housing;
        a valve diaphragm in said valve housing separating said valve housing into first and second valve compartments having a first valve compartment pressure and a second valve compartment pressure, one of said first and second valve compartment pressures being ambient pressure;
        a valve rod connected to said valve diaphragm;
        a spring operatively connected to exert a spring force against said valve rod, said spring having an installed spring length; and
        an adjustable spring seat adjustable in height, for varying the installed spring length of said spring in response to changes in the ambient pressure.

2. The internal combustion engine of claim 1, said adjustable spring seat including a plate and being of variable thickness.

3. The internal combustion engine of claim 2, said adjustable spring seat having first and second wedge shaped blocks, at least one of said blocks being linearly translatable relative to the other of said blocks.

4. The internal combustion engine of claim 2, said adjustable spring seat having a rotatable disk having a ramp at a periphery of said disk.

5. The internal combustion engine of claim 2, including an axially movable control rod.

6. The internal combustion engine of claim 1, including an actuator pot having:
    an actuator housing;
    an actuator diaphragm dividing said actuator housing into first and second actuator compartments;
        one of said first and second actuator compartments being at an ambient pressure; and
        the other of said first and second actuator compartments being at a controlled pressure; and
    a control rod connected to said actuator diaphragm and to said adjustable spring seat.

7. The internal combustion engine of claim 6, said actuator compartment at a controlled pressure being sealed, and having a fixed controlled pressure.

8. The internal combustion engine of claim 6, said actuator compartment at a controlled pressure being connected to a regulated pressure source.

9. The internal combustion engine of claim 8, said regulated pressure source including said compressor outlet.

10. A wastegate valve for controlling a flow of exhaust gas to a turbocharger, said wastegate valve comprising:
    a valve housing;
    a valve diaphragm in said valve housing separating said valve housing into first and second valve compartments having a first valve compartment pressure and a second valve compartment pressure, one of said first valve compartment pressure and said second valve compartment pressure being ambient pressure;
    a valve rod connected to said valve diaphragm;
    a spring operatively connected to exert a spring force against said valve rod, said spring having an installed spring length; and
    an adjustable spring seat adjustable in height, for varying the installed spring length of said spring in response to changes in the ambient pressure.

11. The wastegate valve of claim 10, said adjustable spring seat including a plate and being of variable thickness.

12. The wastegate valve of claim 11, said adjustable spring seat having first and second wedge shaped blocks, at least one of said blocks being linearly translatable relative to the other of said blocks.

13. The wastegate valve of claim 11, said adjustable spring seat including a rotatable disk having a ramp at a periphery of said disk.

14. The wastegate valve of claim 11, including an axially movable control rod.

15. The wastegate valve of claim 10, including an actuator pot having;
   an actuator housing;
   an actuator diaphragm dividing said actuator housing into first and second actuator compartments;
      one of said first and second actuator compartments being at an ambient pressure; and
      the other of said first and second actuator compartments being at a controlled pressure; and
   a control rod connected to said actuator diaphragm and to said adjustable spring seat.

16. The wastegate valve of claim 15, said actuator compartment at a controlled pressure being sealed, and having a fixed controlled pressure.

17. The wastegate valve of claim 15, said actuator compartment at a controlled pressure being connected to a regulated pressure source.

18. A method for controlling operation of a wastegate valve, said method comprising steps of:
   providing a wastegate valve having a valve housing, a valve diaphragm separating said valve housing into first and second valve compartments, a valve rod connected to said valve diaphragm and extending through one of said compartments, and a spring operatively connected to exert a spring force against said valve rod, for urging said rod in a direction, said spring having an installed spring length;
   providing an adjustable spring seat for altering the spring force applied against said rod by adjusting the installed spring length;
   detecting ambient pressure changes; and
   adjusting said spring seat in response to changes in ambient pressure.

19. The method of claim 18, including providing a cam means associated with said adjustable spring seat, and operating said cam means in response to ambient pressure changes.

20. The method of claim 19, including:
   providing an actuator pot for said cam means, said actuator pot including an actuator housing, and an actuator diaphragm separating said actuator housing into first and second actuator compartments;
   connecting said actuator diaphragm to said cam means; and
   providing a controlled pressure in one of said first and second actuator compartments and an ambient pressure in the other of said first and second actuator compartments; and
   adjusting a position of said actuator diaphragm in response to changes in ambient pressure.

* * * * *